United States Patent [19]
Tso et al.

[11] Patent Number: 5,825,166
[45] Date of Patent: Oct. 20, 1998

[54] POWER SUPPLY SELF-ADJUSTED CIRCUIT FOR DUAL OR MULTIPLE VOLTAGE INTEGRATED CIRCUITS

[75] Inventors: Vincent S. Tso, Milpitas; James B. Ho, San Jose, both of Calif.

[73] Assignee: Sierra Semiconductor, San Jose, Calif.

[21] Appl. No.: 615,883

[22] Filed: Mar. 4, 1996

[51] Int. Cl.[6] .................................................. G08C 19/04
[52] U.S. Cl. .......................................................... 323/299
[58] Field of Search .................................. 323/299, 222, 323/313, 211; 363/21, 40, 41, 80, 79, 89, 126; 340/870.39, 347

[56] References Cited

U.S. PATENT DOCUMENTS

| | | | |
|---|---|---|---|
| 4,400,690 | 8/1983 | Brokaw et al. | 340/347 AD |
| 4,635,057 | 1/1987 | Schaefer | 340/870.39 |
| 5,532,918 | 7/1996 | Mayrand et al. | 363/89 |

*Primary Examiner*—Aditya Krishnan
*Attorney, Agent, or Firm*—Burns, Doane, Swecker & Mathis, LLP

[57] ABSTRACT

A power supply self adjusted circuit that can sense a power supply voltage and detect whether the power supply is of a first value (e.g., 5V) or a second value (e.g., 3.3 V). In the case of a modem system, the power supply self adjusted circuit then adjusts the modem system accordingly. Hence, using this circuit, a modem or other signal processing circuit can be designed to work for both 5V and 3.3V power supply systems, for example. Futhermore, the power supply self adjusted circuit enables a modem system to automatically adjust itself when the power supply is switched from 5V to 3.3V or vice versa, without any manual intervention from the user. This capability is important for increasingly-popular PC Card- modems.

13 Claims, 4 Drawing Sheets

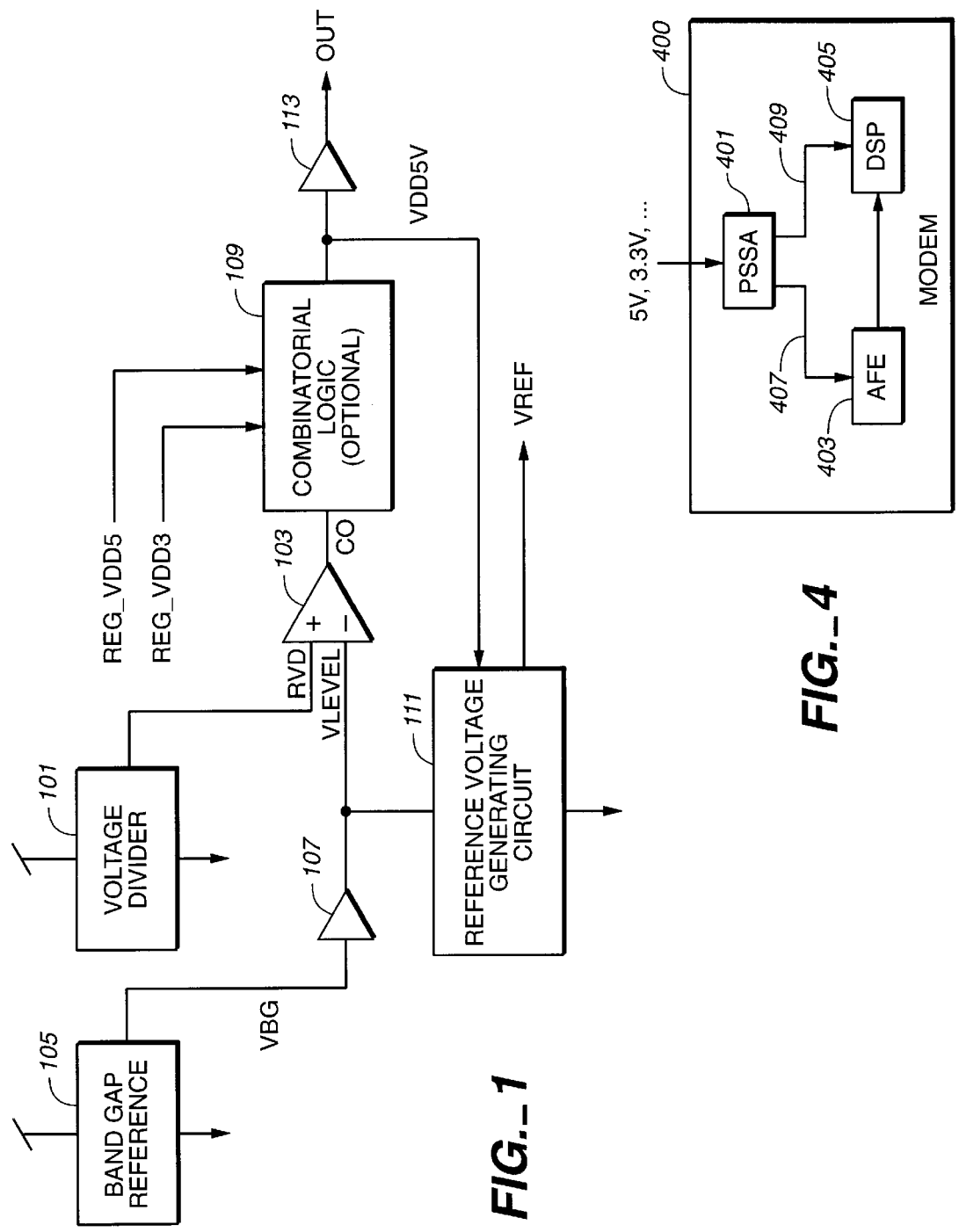

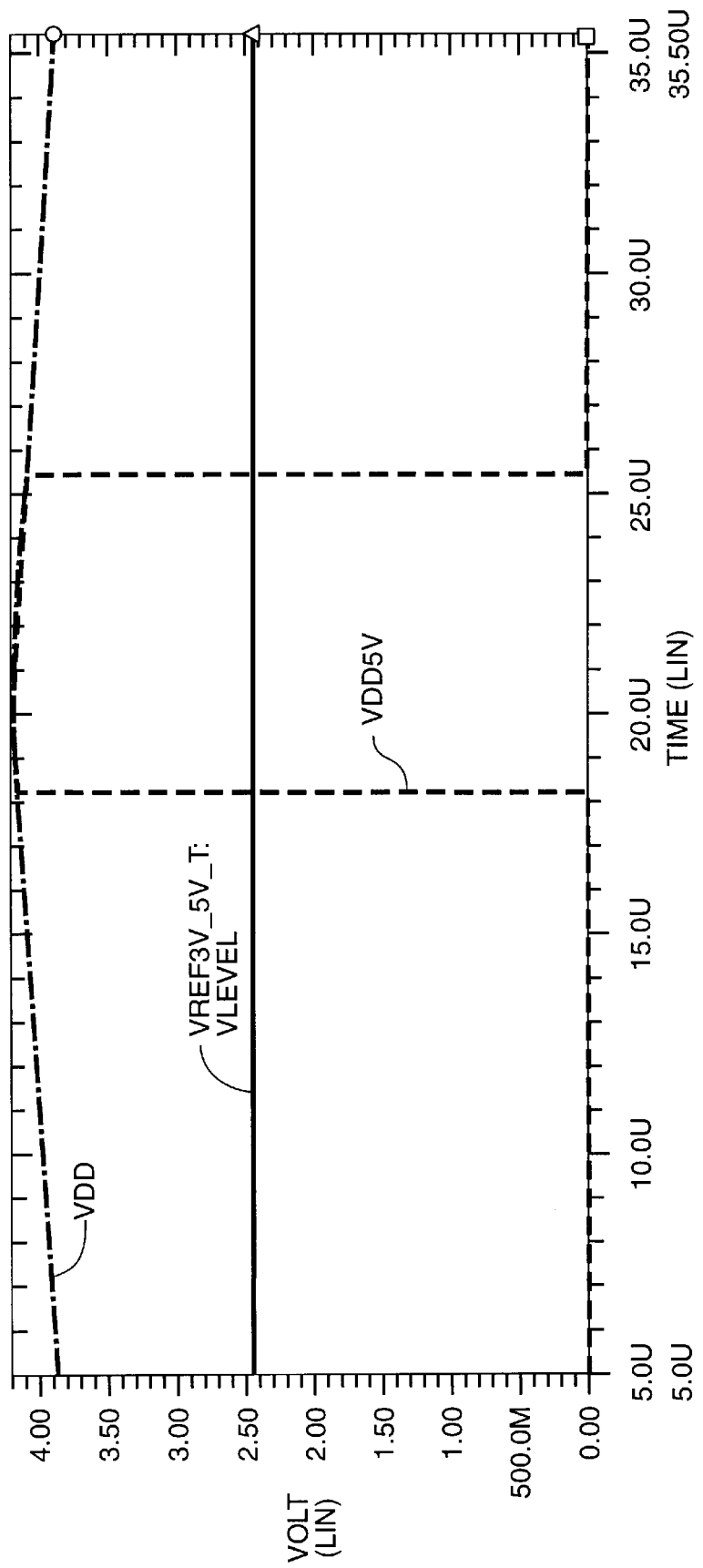
FIG._2A

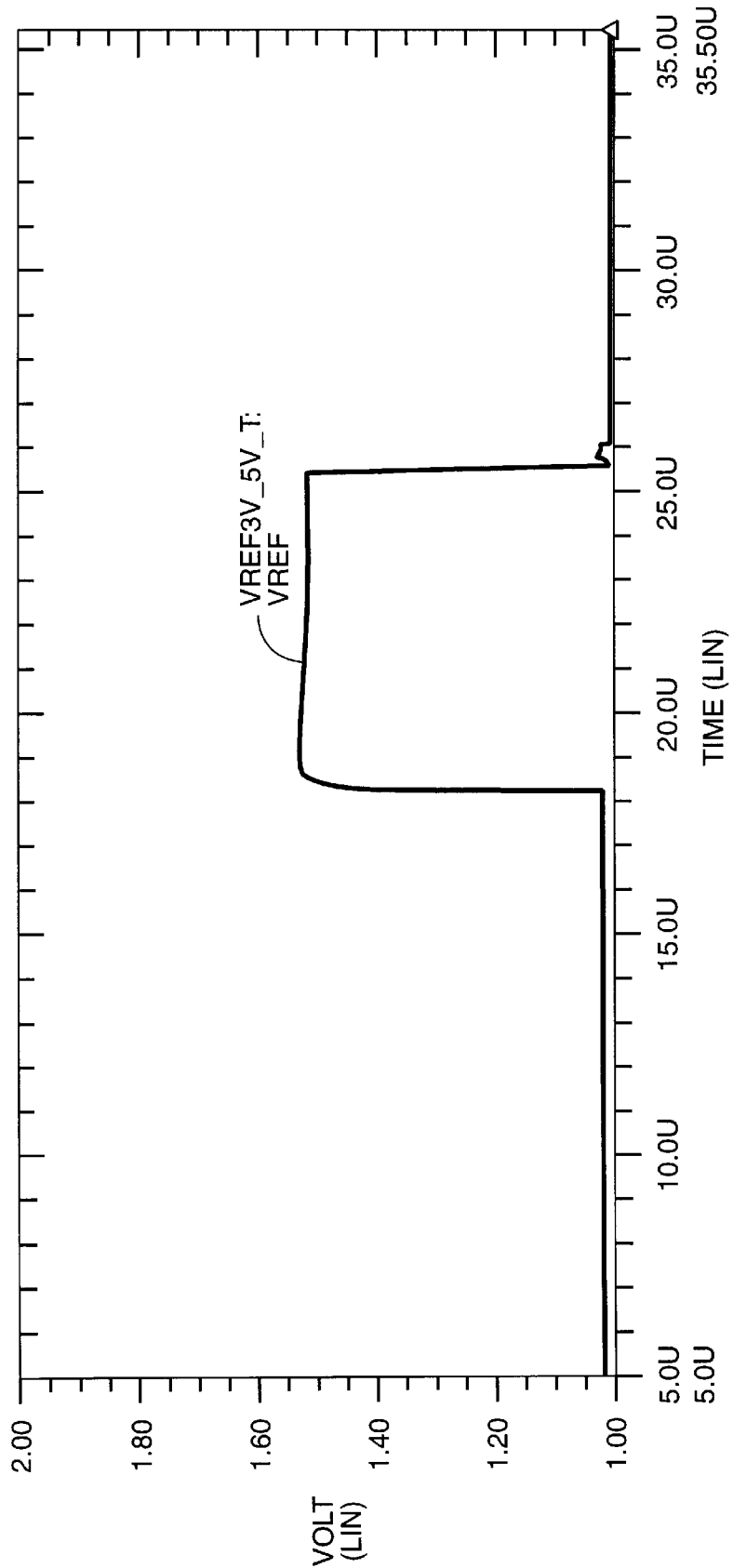
FIG._2B

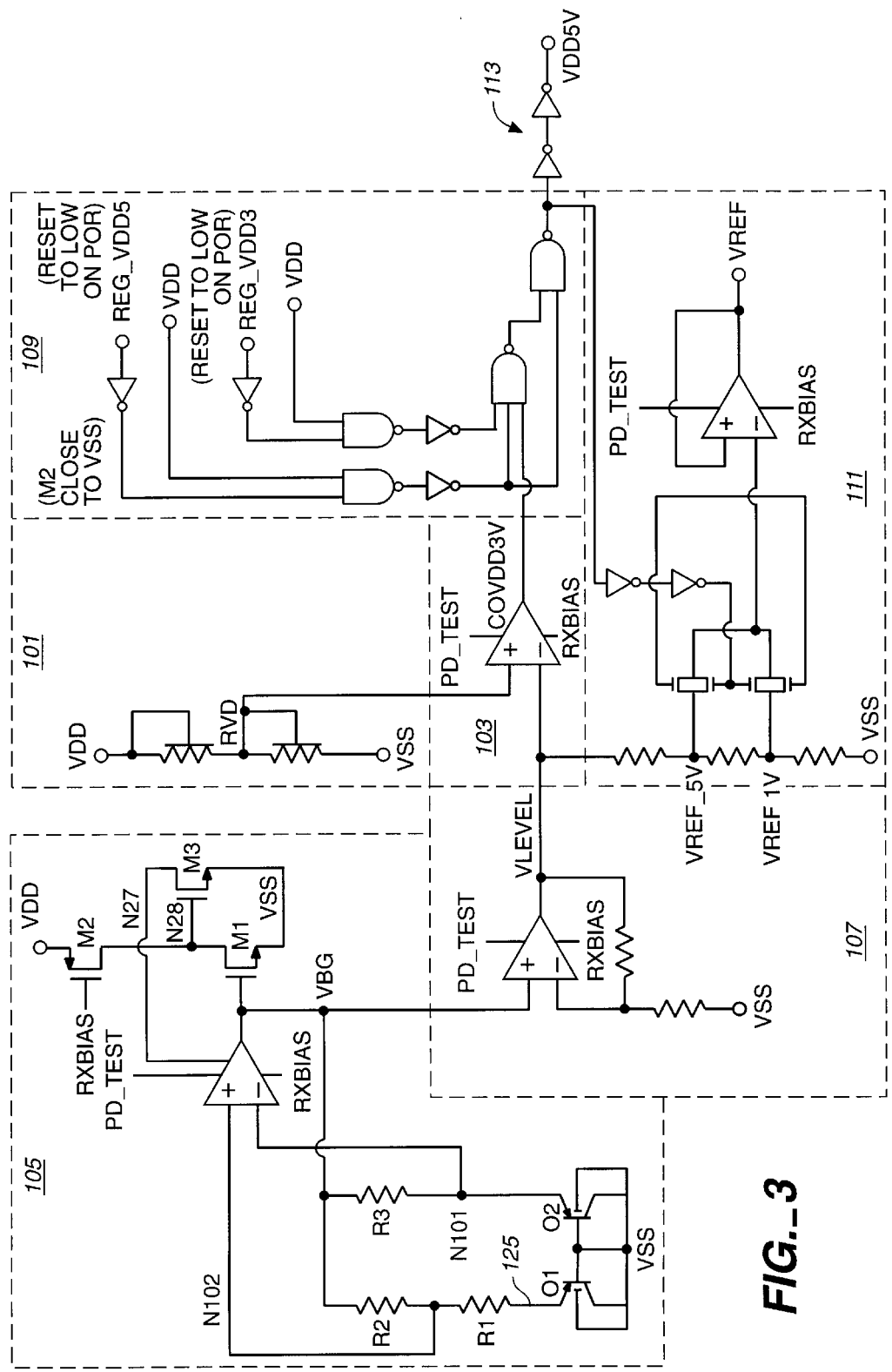
FIG._3 ns, 166

POWER SUPPLY SELF-ADJUSTED CIRCUIT FOR DUAL OR MULTIPLE VOLTAGE INTEGRATED CIRCUITS

BACKGROUND OF THE INVENTION

1. Field of the Invention

The present invention relates to dual or multiple voltage integrated circuits and power supply circuits for the same.

2. State of the Art

Conventional integrated circuits have for many years been designed to operate from a 5V supply voltage. More recently, as computing devices have become more mobile, integrated circuits have begun to be designed to operate from a 3.3V supply voltage. A 3.3V supply voltage conserves battery power in battery-operated computing devices. As is often the case, however, the power conservation achieved using a 3.3V supply voltage involves a tradeoff. In particular, the speed of operation of integrated circuits designed for 3.3V operation is often slower than comparable integrated circuits designed for 5V operation. In analog systems, acceptable performance in terms of signal to noise ration and other criteria is harder to achieve using 3.3V circuits as opposed to 5V circuits. Therefore, 5V integrated circuits will continue to be used. As technology evolves, the industrial standard is likely to call for two or more power supply voltages to co-exist.

The need to supply both 3.3V and 5V versions of essentially the same integrated circuit is burdensome to manufacturers. Therefore, some manufacturers have begun offering dual voltage 3.3/5V integrated circuits that may be operated either from a3.3V or a 5V power supply. This dual voltage compatibility is achieved by designing the integrated circuit with sufficient "margin" to operate correctly from either voltage when system requirements allow. Known, dual-voltage integrated circuits include, for example, clock synthesizers for microprocessors.

The strategy of designing an integrated circuit with sufficient margin to enable it to work in either a3.3V or a 5V environment, however, is not always available. In the case of precision analog or mixed signal integrated circuits where performance tolerances are tight, for example, such a solution would appear to be unworkable. One example of such an integrated circuit is a modem chip set of a type made by the present assignee that includes an "analog front end," or AFE, and a digital signal processor (DSP). Within a chip set of this type, many operations are supply-voltage-dependent. For example, signal-to-noise measurements, energy detection, A/D conversion, D/A conversion, and the particulars of the DSP code are all necessarily supply-voltage-dependent. Hence, prior art modem systems can only work for either a 5V or a3.3V power supply, not both, without at least some jumpers and switches on the system board.

What is needed is an arrangement providing dual or multiple voltage capability for an integrated circuit of the type described.

SUMMARY OF THE INVENTION

The present invention, generally speaking, provides a power supply self adjusted circuit that can sense a power supply voltage and detect whether the power supply is of a first value (e.g., 5V) or a second value (e.g., 3.3 V). In the case of a modem system, the power supply self adjusted circuit then adjusts the modem system accordingly. Hence, using this circuit, a modem or other signal processing circuit can be designed to work for both 5V and3.3V power supply systems, for example. Futhermore, the power supply self adjusted circuit enables a modem system to automatically adjust itself when the power supply is switched from 5V to3.3V or vice versa, without any manual intervention from the user. This capability is important for increasingly-popular PC Card- modems.

BRIEF DESCRIPTION OF THE DRAWING

The present invention may be further understood from the following description in conjunction with the appended drawing. In the drawing:

FIG. 1 is a simplified block diagram of the present power supply self adjusted circuit;

FIG. 2A and FIG. 2B are timing diagrams illustrating operation of the power supply self adjusted circuit of FIG. 1;

FIG. 3 is a detailed schematic diagram of the power supply self adjusted circuit of FIG. 1; and FIG. 4 is block diagram of a modem subsystem including the present power supply self adjusted circuit.

DETAILED DESCRIPTION OF THE PREFERRED EMBODIMENTS

A circuit has been devised to sense a power supply voltage and detect whether the power supply is of one voltage or another voltage, e.g., 5V or 3.3V. Hence the circuit is referred to herein as a power supply self adjusted (PSSA) circuit. The PSSA circuit may be used to adjust a modem AFE accordingly to ensure that the AFE will work for the corresponding power supply voltage. Also, the PSSA circuit may issue a signal to control a modem or other DSP to adjust the DSP code for the corresponding power supply voltage. Thus, referring to FIG. 4, a modem subsystem 400 is shown as including the PSSA circuit 401, an AFE block 403 and a DSP block 405. The PSSA 401 circuit is connected to an unknown external voltage supply. The external voltage supply may be 5V,3.3V, or some other voltage. The PSSA 401 determines what the unknown external voltage supply is and generates an appropriate reference voltage 407 for the AFE. The PSSA also sends a signal 409 to the DSP 405 identifying the external voltage supply, whereupon the DSP loads appropriate code instructions, for example code for 5V conditions or code for 3.3V conditions.

In one embodiment, the modem subsystem is realized in the form of a two-chip chip set including an AFE chip and a DSP chip, the present PSSA circuit being included as part of the AFE. In other embodiments, the AFE and DSP may be combined as a single-chip solution, with the PSSA circuit also being included.

Many advantages accrue from a modem system working with both 5V and3.3V power supplies. First, one single design can satisfy both the desktop and portable market. Such a solution is extremely cost effective. If the system can automatically adjust itself when it is used for 5V or3.3V power supply systems without the need of any manual intervention from the user, it is even more attractive. For example, it is ideally suited for so-called "docking station" machines such as the Apple Duo-, sold by Apple Computer, Inc., which can work as a portable computer with a3.3V power supply or as a desktop computer with a 5V power supply.

Referring now to FIG. 1, the PSSA circuit detects whether the power supply (VDD) is 5V or3.3V by comparing a ratio of VDD against a supply and temperature independent, highly stable voltage. A voltage RVD is produced by a voltage divider 101 connected between VDD and ground and is input to a first input terminal of a level comparator 103. A voltage VLEVEL is input to a second input terminal of the comparator, and is generated from a bandgap voltage VBG produced by a bandgap reference generator 105. The exact voltage of VLEVEL is controlled by a gain stage 107. In a preferred embodiment, the voltage of VLEVEL is set to the mid-point between the voltage of RVD for 5V and 3.3V power supplies, respectively.

When VDD is 5V, the comparator output CO is logical high; vice versa, when VDD is 3.3V, the comparator output CO is logical low. The comparator output CO may be input to an optional combinational logic block 109 if desired, which then produces a resulting output signal VDD5V. The combinational logic block 109 may be used, for example, to set the output of the PSSA circuit to a known or desired state, for testing or for other purposes.

The signal VDD5V may be used to adjust a voltage reference for an analog-to-digital convertor (A/D), a digital-to-analog convertor (D/A) and/or other important functional blocks within the integrated circuit, such as an energy-detection block, etc. In the PSSA circuit of FIG. 1, a reference voltage generating circuit 111 generates an appropriate voltage reference Vref from the voltage VLEVEL in accordance with the signal VDD5V.

Also, the signal VDD5V can be buffered (in a buffer circuit 113) to produce a signal OUT, which may then be used to adjust the DSP codes in a DSP portion of the integrated circuit or to perform other necessary adjustments.

Referring to FIG. 1 and FIG. 2A, the voltage VLEVEL and the output signal VDD5V are shown as a function of time as the power supply voltage VDD is varied. Note that VLEVEL remains substantially constant with changes in VDD. When VDD increases, the voltage RVD rises. When RVD rises above the voltage VLEVEL, the comparator 103 of FIG. 1 causes VDD5V to go high. When VDD subsequently decreases and RVD drops below VLEVEL, the comparator causes VDD5V to go low. In a preferred embodiment, the input of the comparator is provided with a small amount of hysteresis in a manner known in the art in order to avoid undesirable oscillations of the output signal of the comparator.

Referring to FIG. 2B, when the PSSA circuit shown in FIG. 1 detects the changes in VDD and changes the state of VDD5V as shown in FIG. 2A, the resulting signal VDD5V is input to the reference generating circuit 111 of FIG. 1 where it is used to change the reference voltage Vref. Thus, when VDD5V goes high, the reference voltage is changed to a higher reference voltage, and when VDD5V goes low, the reference voltage is changed to a lower reference voltage.

A detailed schematic diagram of the PSSA circuit of FIG. 1 is shown in FIG. 3.

It will be appreciated by those of ordinary skill in the art that the invention can be embodied in other specific forms without departing from the spirit or essential character thereof. The foregoing description is therefore considered in all respects to be illustrative and not restrictive. The scope of the invention is indicated by the appended claims, and all changes which come within the meaning and range of equivalents thereof are intended to be embraced therein.

What is claimed is:

1. A power supply self adjusted circuit, comprising:
   a voltage reference for producing at least one known voltage level using an unknown one of a plurality of possible power supply voltages; and
   a comparator for comparing a voltage derived from the unknown power supply voltage with said at least one known voltage level to produce an output signal identifying the unknown power supply voltage as a particular one of the possible power supply voltages.

2. The apparatus of claim 1, further comprising a reference voltage generating circuit, responsive to the output signal for producing one of a plurality of reference voltages using the known voltage level.

3. An integrated circuit, comprising: an integrated circuit substrate; a voltage reference for producing at least one known voltage level using an unknown one of a plurality of possible power supply voltages; and
   a comparator for comparing a voltage derived from the unknown power supply voltage with said at least one known voltage level to produce an output signal identifying the unknown power supply voltage as a particular one of the possible power supply voltages;
   wherein the voltage reference and the comparator are integrated on the integrated circuit substrate.

4. The apparatus of claim 3, further comprising a reference voltage generating circuit, responsive to the output signal for producing one of a plurality of reference voltages using the known voltage level.

5. A modem integrated circuit, comprising:
   an integrated circuit substrate;
   an analog front end;
   a digital signal processing subsystem;
   a voltage reference for producing at least one known voltage level using an unknown one of a plurality of possible power supply voltages; and
   a comparator for comparing a voltage derived from the unknown power supply voltage with said at least one known voltage level to produce an output signal identifying the unknown power supply voltage as a particular one of the possible power supply voltages; and
   means for modifying operation of the analog front end and the digital signal processing subsystem in response to the output signal;
   wherein the analog front end, the digital signal processing subsystem, the reference voltage and the comparator are formed on the integrated circuit substrate.

6. The apparatus of claim 5, wherein the means for modifying comprises a reference voltage generating circuit, responsive to the output signal for producing one of a plurality of reference voltages for the analog front end using the known voltage level.

7. A method enabling an integrated circuit to be operated from different ones of a plurality of voltage supplies, comprising the steps of:
   generating a known voltage level from an unknown one of said plurality of different possible voltage supplies;
   comparing a voltage derived from the unknown voltage supply to the known voltage level; and
   ascertaining the unknown voltage supply to be a specific one of the plurality of different possible voltage supplies based on results of the comparison.

8. The method of claim 7, comprising the further step of adjusting a reference voltage in accordance with which one of the plurality of different possible voltage supplies the unknown voltage supply is ascertained to be.

9. The method of claim 8, comprising the further step of supplying the reference voltage to an analog front end of a modem.

10. The method of claim 8, comprising the further step of loading different code instructions in a digital signal processor in accordance with which one of the plurality of different possible voltage supplies the unknown voltage supply is ascertained to be.

11. The method of claim 10, comprising the further step of modulating or demodulating data using the digital signal processor.

12. The method of claim 8, comprising the further steps of:
   changing the unknown voltage supply from one of the plurality of different possible voltage supplies to another of the plurality of different possible voltage supplies; and
   repeating the steps of generating, comparing, ascertaining, and adjusting.

13. A chip set including a power-supply self-adjusting circuit, comprising:
   a voltage reference for producing at least one known voltage level using an unknown one of a plurality of possible power supply voltages; and
   a comparator for comparing a voltage derived from the unknown power supply voltage with said at least one known voltage level to produce an output signal identifying the unknown power supply voltage as a particular one of the possible power supply voltages;
   wherein the voltage reference and the comparator are integrated on an integrated circuit substrate.

* * * * *